(No Model.)
F. W. NIEHAUS.
COMBINED SCAFFOLD AND LADDER.
No. 316,643. Patented Apr. 28, 1885.
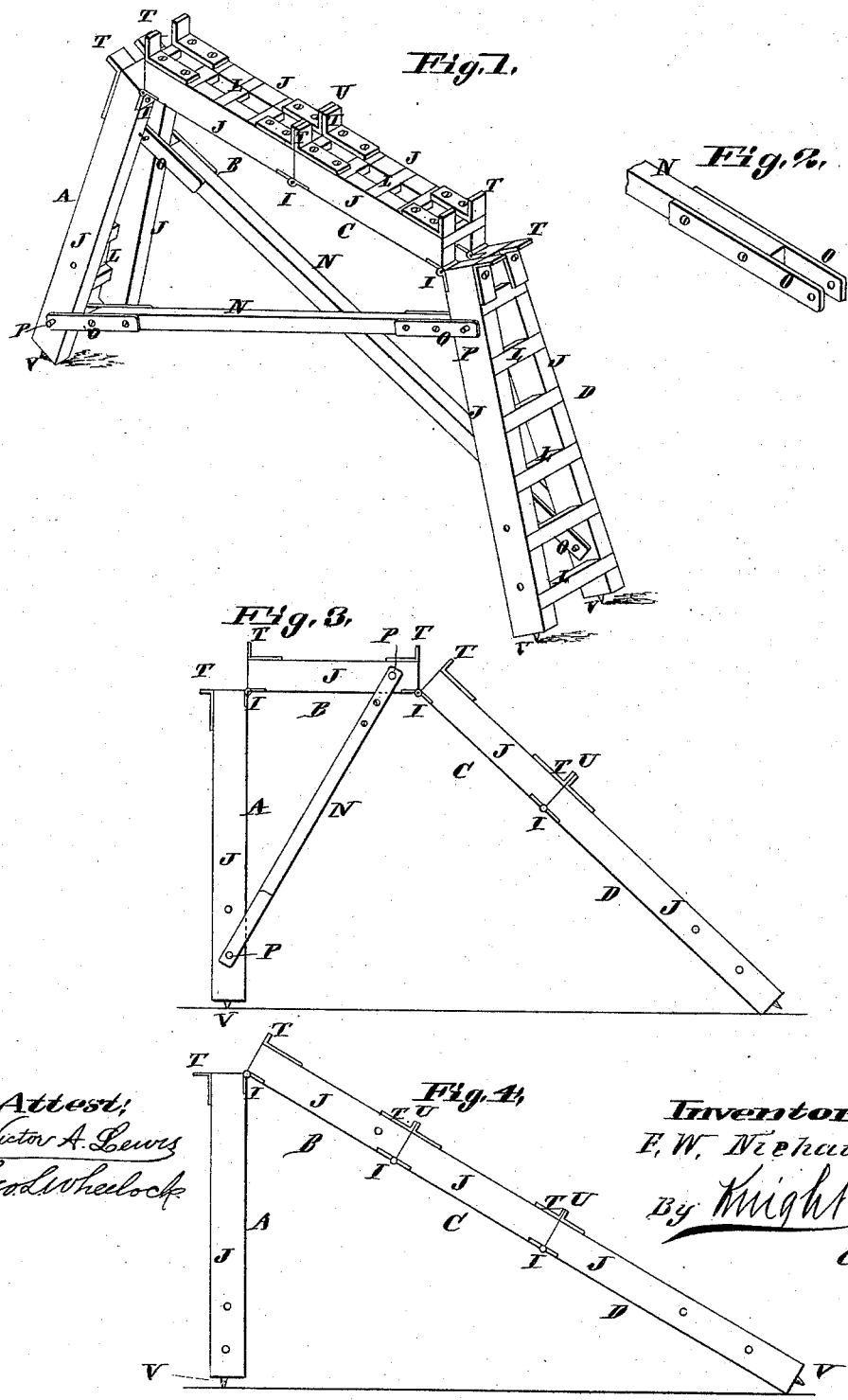
Attest:
Victor A. Lewis
Geo. L. Wheelock
Inventor:
F. W. Niehaus
By Knight Bros
Attys

UNITED STATES PATENT OFFICE.

FREDRICK W. NIEHAUS, OF McGIRK, MISSOURI.

COMBINED SCAFFOLD AND LADDER.

SPECIFICATION forming part of Letters Patent No. 316,643, dated April 28, 1885.

Application filed February 13, 1885. (No model.)

*To all whom it may concern:*

Be it known that I, FREDRICK W. NIEHAUS, of McGirk, in the county of Moniteau and State of Missouri, have invented a certain new and useful Improvement in a Combined Scaffold, Skid, and Ladder, of which the following is a full, clear, and exact description, reference being had to the accompanying drawings, forming part of this specification, and in which—

Figure 1 is a perspective view of my improved apparatus. Figs. 3 and 4 are side views or elevations of same in different positions; and Fig. 2 is a perspective view of one end of one of the braces or tie-bars.

My invention relates to an improved scaffold that may also be used as a ladder capable of being put in a number of positions to accommodate it to different uses; and my invention consists in features of novelty hereinafter fully described, and pointed out in the claims.

Referring to the drawings, A B C D represent the scaffold made in sections united or secured together by hinges I, as shown, and each preferably consisting of side bars, J, connected by strips L that form steps by which a person can mount the apparatus. It can be placed in the positions shown in Figs. 1, 3, and 4, and when in the positions shown in Figs. 1 and 3, braces or tie-bars N are employed to hold the parts in place, the braces having plates O on their ends that embrace the side pieces or bars, J, and are connected thereto by pins P. When in the position shown in Fig. 1, it is intended for use purely as a scaffold. When in the position shown in Fig. 3, it is intended to be used as a skid and scaffold, and when in the position shown in Fig. 4, as a skid only. At the ends of the sections opposite the hinges are upwardly-projecting plates or pieces T that act to strengthen the hinges when the two adjoining ends of sections come together, as shown at U, and they also act to hold boards in place upon the scaffold.

The bottoms of sections A and D have spikes V, to enter the ground and prevent the parts from slipping.

I claim as my invention—

1. The combination of three or more sections hinged together end to end and provided on the side opposite to said hinges with lugs projecting therefrom, substantially in the manner and for the purpose set forth.

2. The combination of three or more sections hinged together end to end and adapted to form a skid and scaffold, said sections being provided at their meeting ends with lugs T T, which project therefrom, substantially in the manner and for the purpose set forth.

FREDRICK W. NIEHAUS.

In presence of—
B. B. HENRY,
E. E. BRAMEL.